Aug. 12, 1952     W. B. HERNDON     2,606,461
DRIVE PICKUP MECHANISM
Filed July 26, 1946                                                 4 Sheets—Sheet 4
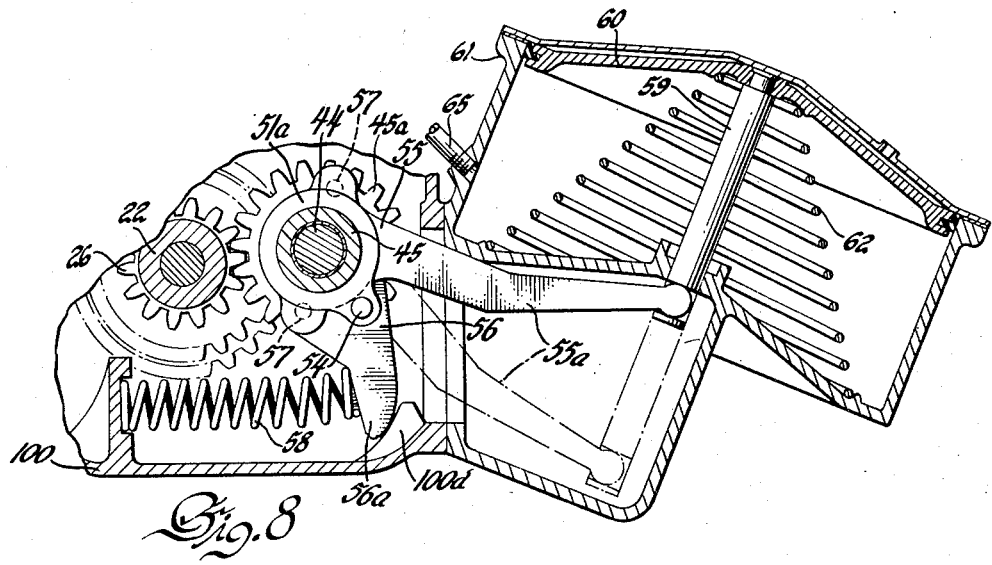
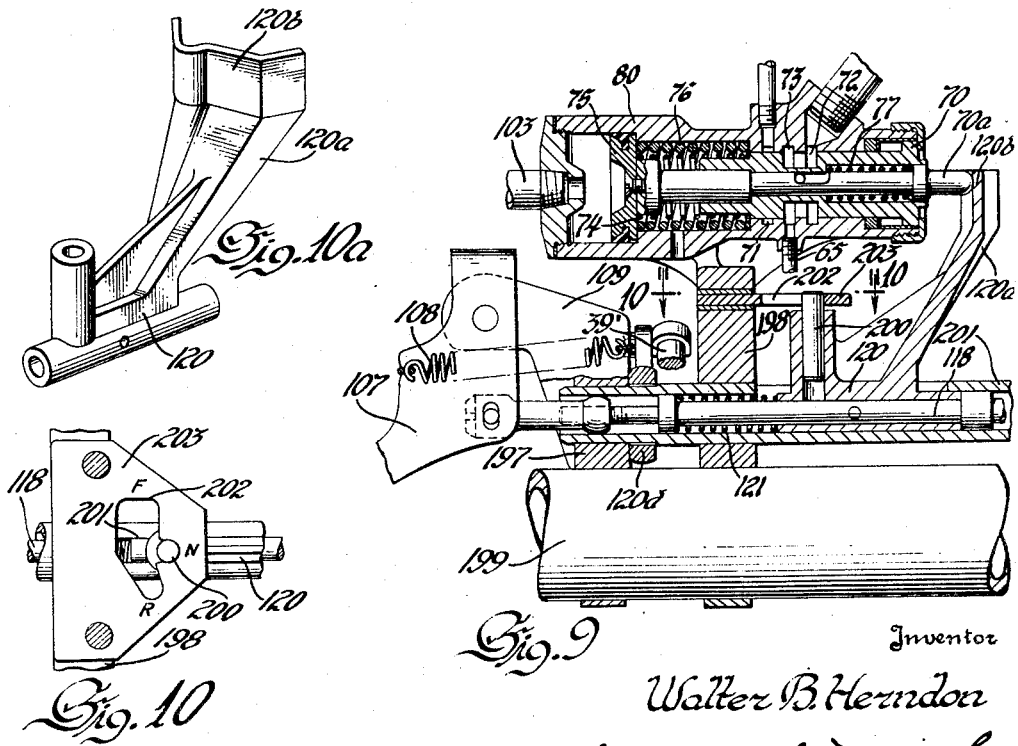
Inventor
Walter B. Herndon Patented Aug. 12, 1952

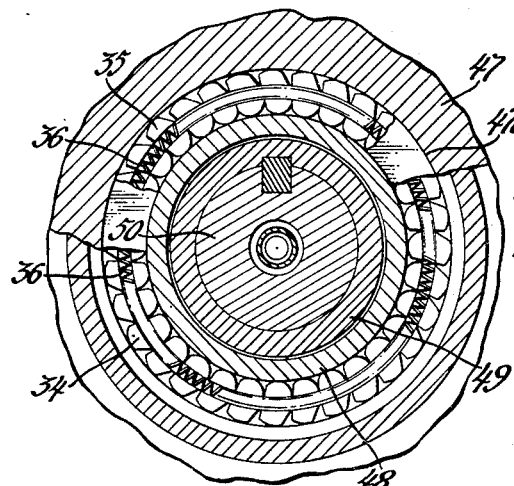
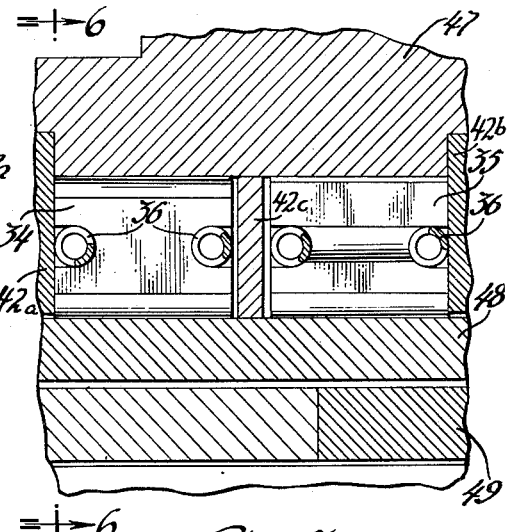
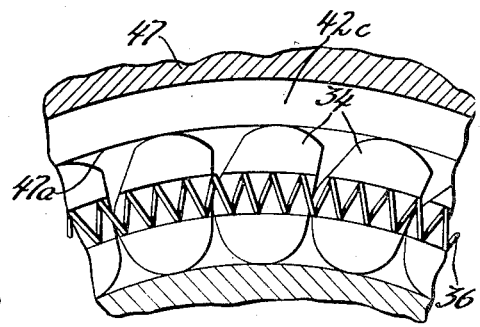
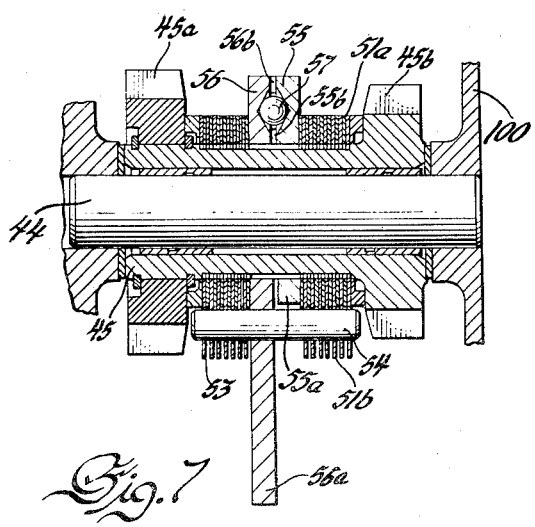

2,606,461

UNITED STATES PATENT OFFICE 2,606,461

DRIVE PICKUP MECHANISM

Walter B. Herndon, Detroit, Mich., assignor to General Motors Corporation, Detroit, Mich., a corporation of Delaware Application July 26, 1946, Serial No. 686,361

17 Claims. (Cl. 74—732)

The present invention relates to special forms of gear drive mechanism having means for facilitating pick-up of initial drive and equipped with controls effective to prevent wrong operator motion, and to prevent mechanical shock when such pick-up action is required. It embodies unique means which include overrunning devices utilized in a novel manner to achieve non-shock connection of forward or reverse drive.

An object of the invention resides in the provision of a dual overrunning mechanism translatable to connect selectively the forward and reverse drive in a gear assembly. A further object is the provision of controlled means for preventing spin of idling transmission elements during such forward and reverse shift, and in the provision of means coordinating the spin prevention means with the shift control for said drive pickup means.

An additional object of the invention is the provision of supervisory overcontrol means for the spin-prevention means control, subject to the rotation of the input drive of the transmission. An object is likewise to provide a power operated device subject to the said drive pick-up control for energising the spin-prevention means, and to connect the control for said device so that when the overcontrol means is operating, the operator's drive pick-up control is ineffective to energise the said spin-prevention means. A further object is to utilize a fluid turbine drive unit between the engine and the gearing which is connected by the pick-up means, the torque connections of which are controlled so that the residual torques translated during idling of the engine are of sufficiently low magnitude that they may be conveniently absorbed by the said spin-prevention means without overload or excessive heating. A further object is to provide an automatic self-loading actuator in the energisation of the spin-prevention means by the power-operated device, for rapid operation thereof, as called for by the movement of the drive pick-up control means.

Other and additional objects and advantages will appear in the specification which follows, in connection with the appended drawings.

Figures 4, 5 and 6 are sectional views of the overrunning clutch assembly of Fig. 1, in which Fig. 4 shows at top and bottom respectively part transverse sections of the dual clutch, Fig. 5 is an axial part-section of same enlarged from the Fig. 1 showing, and Fig. 6 is an enlarged part-section of a portion of the lower half showing of Fig. 4.

Figure 1:
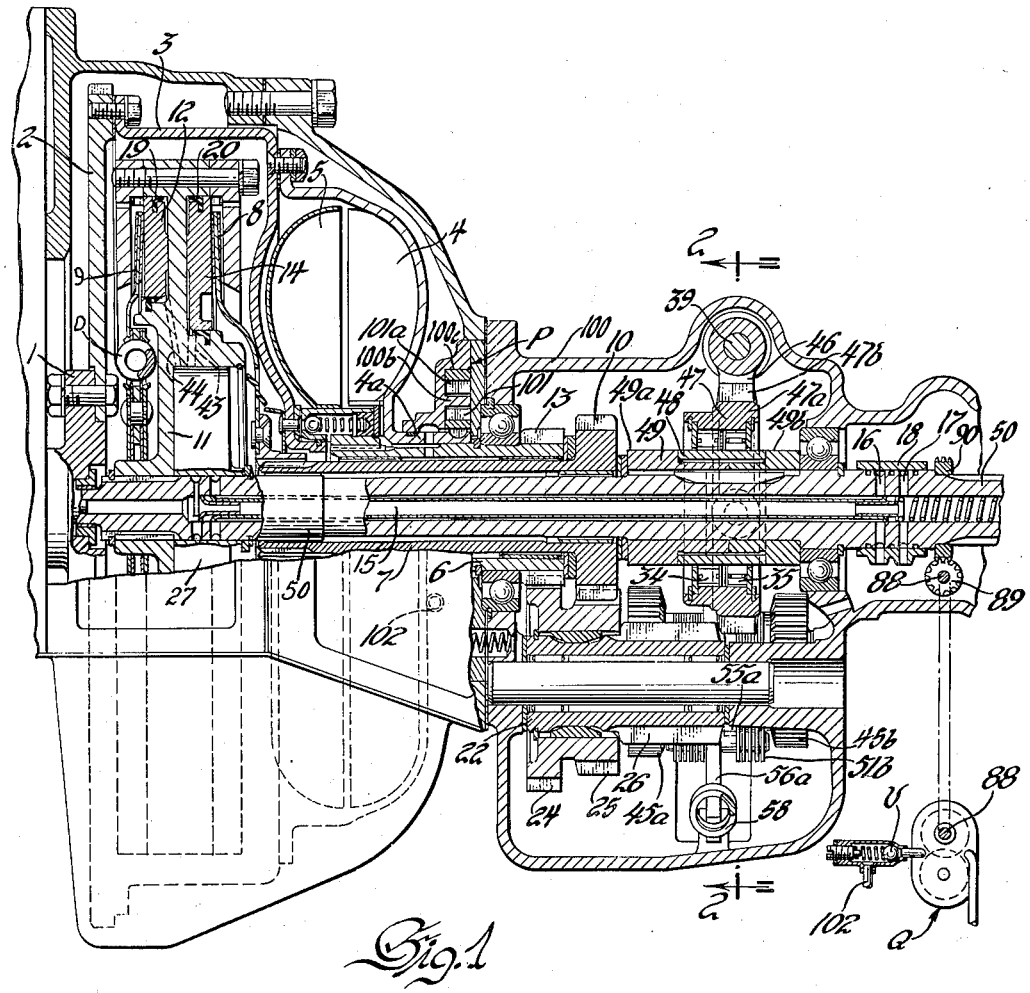
Figure 1 is a vertical, longitudinal section of a gear drive unit serving as a demonstration of the invention.
Figure 2:
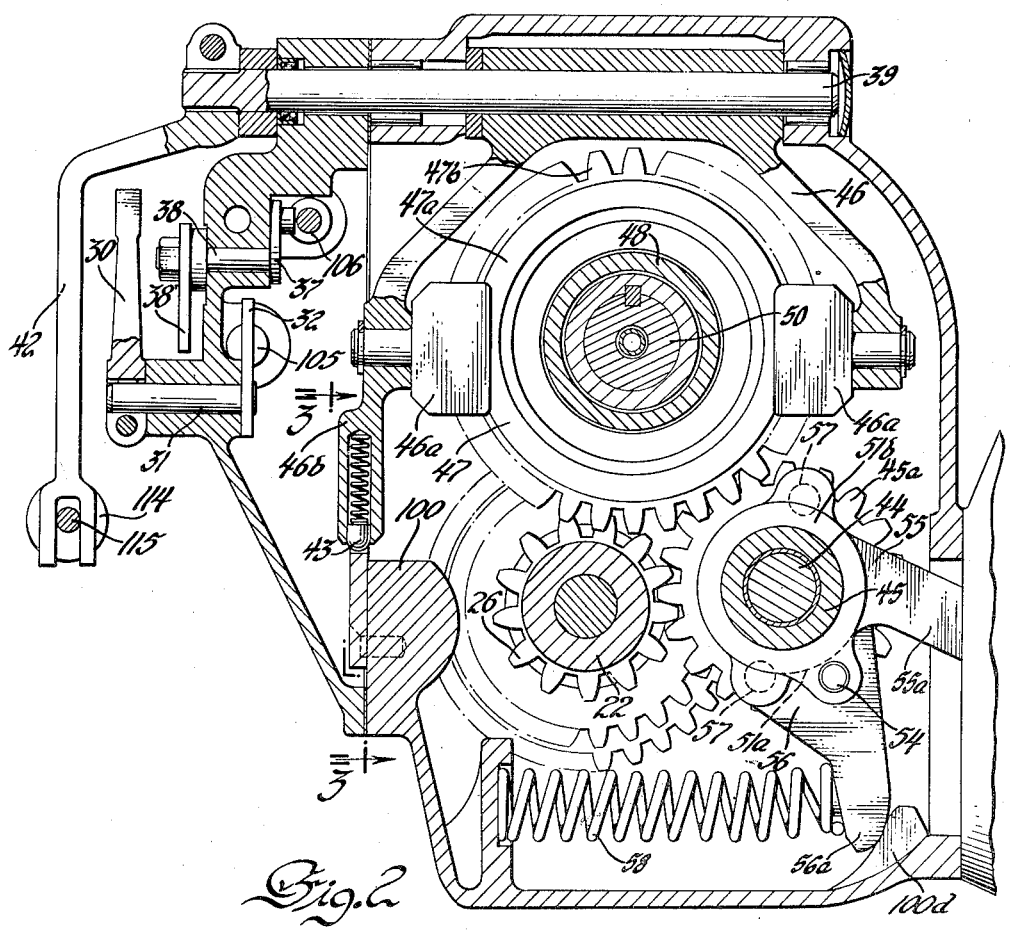
Figure 2 is a section taken at 2—2 of Fig. 1.

Fig. 7 with Fig. 8, and coordinated with the lower portion of Fig. 2 show the construction of the spin-prevention mechanism, the self-loading actuator, the power-operated device and the braking means associated with the transmission reverse idler. Fig. 7 shows the latter device in axial section in a plane parallel to the Fig. 1 view and transverse to the structures of Figs. 2 and 8. Fig. 8 is a transverse view extended to the right of Fig. 2.

Fig. 9 is a sectional showing of the power-means control valve and shift-coordinating means by which the actuation of the spin-prevention or idler-braking apparatus is correctly timed. Fig. 10 is a schematic pattern of the operator handle and guide plate motion by which the construction of Fig. 9 is controlled. Fig. 10a is a detail of the shifter arm cam of Fig. 10, for moving the spin-preventing control valve of Fig. 10.

The general drive construction shown in Fig. 1 is a change speed gear unit of the constant mesh type having plural input and output elements selectively coupled for utilizing a range of forward speed ratio drives, without transferring torque during the ratio shift intervals between or among sliding jaw clutch members. This is accomplished in part by the use of a fluid flywheel having impeller 4 and driven rotor 5, the shaft 6 attached to rotor 5, having formed on it gear member 13, meshing with countershaft gear 24. An alternate path of input torque is provided by clutch plate 9 rotating with flywheel 2 and being gripped to the drum 11 connected to shaft 59 by presser plate 12 formed as a piston in an annular recess in the drum. The hollow shaft 7 is attached to gear 10 which meshes with countershaft gear 25, and the hub of clutch plate 8 is splined to the forward end of shaft 7, the annular piston 14 correspondingly gripping plate 8, when it is desired that the output drum 11 be coupled to the gear train through gear element 10. Shaft 7 joins plate 8 to gear 10.

The clutch presser plates 12 and 14 are actuated by fluid pressure admitted to the respective annular cylinders 19 and 20 by passages in the body of the drum 11 designated as 44 and 43 respectively, plate 8 being gripped for 2nd speed drive and plate 9 for direct or "High." The central space 27 within the drum 11 houses control devices not involved in the present invention, and the devices are fed and controlled by fluid pressure delivered to the inner and outer spaces of tube 15 set in the central bore of output shaft 50 thru radial passages 16 and 17 open to ordinary annuli encircling the shaft 50, and open to external passages in gland 18. Fluid pressure for selective energising of the clutches 8 and 9 reaches space 27 of drum 11 along the space external to the tube 15 from radial passage 16, that inside the tube 15 from radial passage 17 being used to introduce overcontrol pressures—the effective fluid pressure for clutch actuation and control being primarily derived from rotation of pump P, the driving gear 101 of which is rotated by an extension collar 4a of impeller 4.

A pump delivery outlet 102 is indicated in dashed line in Fig. 1 and among other connections, is joined to pipe 103 of Fig. 9 for preventing action of the spin prevention means when the pump line pressure exceeds a given pounds pressure value above idling pressure. Pressure is provided by two pumps P and Q, input and output driven, as will be understood further in detail.

Fig. 1 shows a sectional elevation of the drive transmitting elements of the gear assembly within the casing 100. The drive of the engine and fluid clutch assembly at the left is brought into the primary gear 13 which is constantly meshed with countershaft gear 24 fixed to countershaft body 22 on which gear teeth 25 and 26 are formed.

The output shaft 50 passes through the gearing assembly and is keyed to external race sleeve 49 supporting idling race ring 48 for the roller clutch assembly.

The sleeve 49 is recessed circumferentially to accommodate the race ring 48, and is finished externally at either end to form overrunning clutch races 49a and 49b. The ring 48 has an internal bearing of soft metal to permit free running. An overrunning clutch race ring 47a is formed within the body of gear member 47, which has external teeth 47b to mesh with the teeth 26 of the countershaft for forward drive.

The reverse idler gear shown in Fig. 7 in better detail, is composed of a gear body 45 with two rings of teeth at either end thereof 45a and 45b respectively, the teeth 45a meshing constantly with the teeth 26 of the countershaft, therefore the reverse idler member 45 is continuously rotated whenever rotation is applied to either of gears 13 or 10.

The teeth 45b of the reverse idler member 45 under reverse shift, are engaged by the ring of teeth 47b on the external portion of the outer member 47 of the overrunning clutch.

Between the outer and inner race members of the overrunning clutch are two adjacent sets of wedge members 34 and 35. The first set 34 is inclined as shown in the upper half of Fig. 4 and formed in outline, for the external contours required to establish overrunning wedging action. The second set 35 is reversely inclined as shown in the lower portion of Fig. 4. The lateral faces of both sets of the wedge members 34, 35 are recessed in a circumferential direction at a given angularity with respect to the inclined axis of the wedge members so that energising springs 36 fitted into the series of recesses which form a channel on either side of the rings of wedge members, provide initial strut loading for the proper functioning of each overrunning device as a clutch.

The external member 47 serves as a carrier for the wedge members of both of the clutches, which are held in place by common retainer plates 42a, 42b and 42c and locking rings 42d, so that when the member is moved axially the entire assembly slides with it. The central plate or washer 42c bears axially against both sets of wedges 34 and 35. Fig. 2 shows rock shaft 39 fork 46 and shoes 46a for shifting member 47 fore and aft by lever 42 controlled by the operator. A check valve, not numbered, is recessed in a construction attached to the hub of the rotor 5, for controlling the degree of pressure existing in the working space of the rotors 4 and 5, within the drum 3, but is not pertinent to the present invention.

When it is desired to transmit the low gear drive from the countershaft 22 to the output shaft 50, the member 47 and overrunning clutch assembly are moved forward, the ring of wedges 34 moving from the idling race ring 48 to the adjacent portion 49a of the sleeve 49 which has the same external diameter as the ring 48. As viewed in Fig. 4 it will be understood that forward rotation applied to the ring of teeth 47b by the countershaft gear 26 will transmit forward torque to the sleeve 49 keyed to the output shaft 50, and that the latter may overrun.

To transmit the drive in reverse, the member and overrunning clutch assembly are moved to the right in Fig. 1 such that the overrunning clutch strut wedges 35 slide axially from the inner race ring 48 to the adjacent portion 49b of sleeve 49 having the same diameter as the race ring, and consequently meshing of teeth 47b with the ring of teeth 45b of the reverse idler will transmit reverse torque to the output shaft 50, the wedges 35 permitting overrunning likewise in reverse.

The novel method of shifting from forward to reverse torque by the sliding of the external race member 47 and overrunning assembly solves a difficult problem in the art of picking up the drive of a motor vehicle by mechanical means. The reverse idler shaft of Figs. 1 and 7 is equipped with a braking mechanism for the purpose of stopping the residual rotations of the driving parts forward of the gear member 22, when the shift is in neutral, and likewise for the purpose of relieving the input torque drag when the shift is in forward or reverse, when it be desired to shift to neutral. This mechanism therefore serves to protect the overruning clutches against shock loading, and facilitates getting into and out of low or reverse drive.

Lever 42 connects to arm 120d of Fig. 9 thru a common lost-motion connection in rod 39'.

The reverse idler gear body 45 is splined to accommodate a set of small plates 51a toothed internally to fit the splining, intermeshed with a set of plates 51b held against rotation by pin 54 recessed in collar 56. A collar 55 faces the collar 56 and has projecting arm 56a as shown in Figs. 7 and 8 and may be rocked through a limited arc of motion by the servo means to be described later. The adjacent faces of collars 55 and 56 are recessed in shallow ovals, and assembled with bearing balls 57 so that in a given condition of the parts, the set of plates 51a may rotate freely with idler body 45 without drag against the non-rotating plates 51b. The collar 56 is equipped with projecting lever 56a shown in Figs. 2 and 8, the lever 56a being loaded to occupy a stop position by spring 58 recessed in the housing 100.

As shown in Fig. 8 the assembly of the braking mechanism is unloaded. Stop 100d limits the travel of lever 56a.

When it be desired to bring the rotating parts connected to the reverse idler body 45 to non-rotating condition, the arm 55a of collar 55 is rotated, causing the balls 57 to exert axial force between the collars, which loads the plates 51a and 51b, thereby braking the idler body 45. The reaction is supported by spring 58 of Fig. 8 and the collar 56 rotates clockwise compressing the spring 58. The permitted arc of motion of the lever 56a is so taken that the rotating idler body 45 is not only brought to rest, but may also rotate a slight distance further due to overtravel of the system as spring 58 is compressed.

The arm 55a of collar 55 is rocked by the rod 59 of the vacuum motor piston 60 shown in Fig. 8. The vacuum motor casing 61 is mounted on the transmission casing 100 and contains piston 60 normally held in the upper portion by spring 62. The operator control admits engine vacuum derived from the engine intake manifold through passage 65 to the cylinder 61 which draws the piston 60 downward, to rock the arm 56a from the upper position shown in heavy line to the lower position shown in dashed line.

Figure 3:
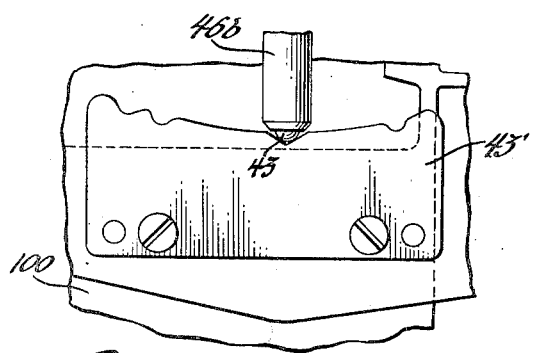
Fig. 3 is a detail of the shift control of the drive pick-up means shown in Figs. 1 and 2.

In Fig. 2 the arm 30, shaft 31 and arm 32 are articulated in a boss of the casing 100, to vary the action of valve 105 with rocking motion of the external arm 30. Valve 106 is similarly operated by arm 37, shaft 38 and external arm 38', to provide a ratio shift selection pattern for the operation of the two clutches 8 and 9. In the same view, fork 46, shoes 46a, shaft 39 and external arm 42 provide the means to shift member 47 and the dual overrunning clutch assemby for establishing low and reverse gear drive of shaft 50. The poppet 43 of Figs. 2 and 3 provides proper position feel to the manual forward and reverse control of Fig. 9. Adjustable poppet plate 43' is fixed to the lateral wall of the casing 100, in planar alignment with portion 46b of fork 46.

Returning to the clutch control system for changing ratio, the closing of clutch 8 by pressure behind piston 14 supplied thru appropriate passages, transmits the drive of shaft 6, gears 13—24, 25—10, to shaft 7, drum 11 and shaft 50 at the intermediate ratio determined by the radii of the various gears, whereupon the forward overrunning clutch wedges 34 cease to drive collar 49 and overrun while there is now 2-way connection between shaft 50 and shaft 7. Release of clutch 8, and engagement of clutch 9 by pressure applied behind piston 12, thru the agency of proper control valving uncouples the gear train from the torque, and connects flywheel 2 directly to shaft 50, the overrunning clutch 34 also idling since the collar 49 rotates faster than any spinning component from the conjugate drive trains may be transmitted.

The valving 105, 106 of Fig. 2 may be manually and automatically operated by proper connection of other parts to elements 32 and 37, the details of which are not essential to the present invention, it being obvious that a full range of 3-speeds forward drive is provided by initial shift operation of member 47 followed by alternate energising of clutches 8 and 9, for drive in 2nd and High.

A second pump Q shown at the lower right in Fig. 1 may be driven from cross shaft 88 gear 89 and gear 90 rotating with shaft 50 to augment the pressure of pump P in main pressure pipe 102.

In Fig. 2 shifter body 47 is translated by fork 46 and shoes 46a, from rock shaft 39 and lever 42, linked to the shift motion of Fig. 9 by appropriate rods, the rotation of shaft 120 reciprocating the lever 42. Guide track plate 43' shown in Fig. 3 is fixed to intersect the motion of extension arm 46b of fork 46 and the position poppet 43 provides the aforesaid yielding latch feel for neutral forward and reverse positions of the fork 46.

The fluid pressure feed from the pumps P and Q for actuating the clutch pistons 12 and 14 of Fig. 1 may be controlled by valves 105 and 106 of Fig. 2, valve 105 being moved by cam 32 of shaft 31, the lever 30 of which may be operated by the engine accelerator pedal to cause valve 105 to vary the effective pump line pressure fed to the clutches. Valve 106 is moved by arm 37 of shaft 38 the lever 38' of which is connected by appropriate rodding to lever 107 of Fig. 9 to provide overcontrol of the valving by the operator. This valve-operating structure is not involved in the present invention except for indicating means to deal with the drive in other than forward and reverse ratios. It is believed sufficient to note that the clutches 8 and 9 are operative for 2nd and direct as described herein.

The operator's forward-neutral-reverse control is provided by the construction of Fig. 9 taken with Figs. 10, 10a and referred to Figs. 2 and 3.

In Figure 9 the vehicle steering column 199 supports brackets 197 and 198, which are formed with bores to accommodate the hollow shifter shaft 201. An extension arm 120a of member 120 is formed as a cam surface for the operation of the valve member 70.

As will be understood further the valve 70 is normally held in an inactive position by the effect of the oil pump pressure applied to plunger 75, so that the operator cannot inadvertently energise or actuate the braking mechanism of Fig. 7 for the reverse idler shaft 45 when the car is in motion.

The normal operation of the shift control shaft 201 causes the cam end 120b to rotate about the center of the shaft so as to position the projecting rod 70a of valve 70 for energising the Figure 7 construction upon motion to or from the forward and reverse positions indicated in Fig. 10 as well as in the positioning of the control pin 200 in the neutral portion of the slot. Spring 121 loads member 120 to right.

The rocking shifter shaft 201 is supported for rotation in bearing holes in the brackets 197, 198. The radial extension of member 120 carries the pin 200 registering with slot 202 of guide plate 203 secured to the bracket 198. The contour of the slot 202 therefore limits the rotational motion of the pin 200 and the member 120. Valve operating arm 120a of member 120 moves in an arc, limited by slot 202, and its cam end 120b acts as a striker for the protruding rod 70a of the vacuum valve 70, to be described further. The cam end 120b is formed as shown in Fig. 10a, and is therefore capable of operating valve 70 by rotation as well as by axial motion. When the shaft 201 is rocked between "F" and "N" the resultant axial motion of pin 200 causes cam 120b to shift valve 70 against the spring 74 thru the stiff spring 77 and connect the vacuum servo port 73 with the manifold port 71 while shutting off the atmosphere in port 72. Spring 62 of Fig. 8 is thereupon loaded, and piston 60 with rod 59 rocks lever 56a to load the mechanism 55, 56, 57 on plates 51 of Fig. 7.

In Fig. 10 the shift control is shown, pin 200 moving in an arc between a position "F" at the top, and position "R" at the bottom of the slot 202 of plate 203, these designations being for forward and reverse drive respectively. At the mid-position of the arc the control shaft 201 of Fig. 9 is moved to the right to position "N" for neutral, these motions being transmitted through proper linkage to the cross shaft 39 of Figs. 1 and 2, as will be understood further in detail.

The vacuum valve 70 of Fig. 9 as noted, controls the vacuum servomotor of Fig. 8 and is connected to the engine manifold at port 71, to the atmosphere or to the intake air cleaner at port 72 and to the servomotor feed line at port 73, the valve shifting leftward from the position shown in which it is connected to atmosphere, to a position in which it admits engine vacuum to the servomotor of Fig. 8.

Since it is desired to bring the spinning parts to rest prior to a shift from neutral or to neutral from a gear drive position, the valve 70 is properly moved to the second position when rotation of shaft 201 by member 120 occurs. Member 120 is guided by a slot (not numbered), in the wall of shaft 201 so that its rotational motion is that of the shaft 201. The slot is elongated so that axial motion of member 120 is permitted, the spring 121 tending to hold pin 200 against the right hand cam surface of slot 202 in plate 203. The contour of the slot 202 with respect to the motion and form of cam face 120b and the linear motion of rod 70a establish the normal action of energising the servomotor 61—60 during the intervals of going into and coming out of forward or reverse gear. It should be observed that upon going into gear, all of the spinning parts are brought to rest whereas upon coming out of gear the loading mechanism releases quickly due to the release of force on the spring link described.

To prevent improper operation of valve 70 when the car is in motion above a given low speed, a measured lost motion is provided between cam 120b and valve 70 by means of a short slot in the rod and a registering pin held in the shank of the valve, the slot-and-pin being unnumbered. Arm 120d is pivoted to rod 29 which operates lever 42 of Fig. 2, thru a common lost motion connection 114 and clevis 115.

The web 100b of the casing 100 serves as a backing plate for the pump P, noted above in connection with Fig. 1, the portion 100c being recessed for pump gears 101 and 101a, the gear 101 being driven by a key from shaft 4a of the impeller 4 of the fluid flywheel assembly. The pump body is fitted with an output connection 102 which is the feed passage for the transmission control system. Passage 102 is connected to passage 103 exposed to the left-hand face of plunger 75 fixed to the left end of valve 70 of Fig. 9. Body 80 houses valve 70 and parts shown. A second pump Q is driven by shaft 50 and contributes pressure to the servo pressure in line 129 thru an appropriate check valve $v$ as shown in Fig. 1, so that reverse output shaft rotation will not starve the pump P.

It is desired that the plunger 75 respond to a given minimum low pressure, indicative of engine speed above idling or of vehicle speed above 3 to 4 miles per hour.

The spring 76 returns the plunger upon fall of the pump line pressure for relief in 102 and the connected feed lines.

This assures that the overrunning clutch system is completely protected against shock loading, and against torque drag, since the spin-prevention device of Fig. 7 is always energised for the forward-neutral-reverse shift interval, and is protected against energisation except at low pump pressures when the latter is incapable of disabling the operation of the vacuum servo valve.

With the vehicle stopped and the engine idling only flywheel 2, drum 3, and impeller 4 rotate with the engine. At idling speeds, rotor 5 receives a small torque value transmitted by the fluid circulating in the fluid flywheel, which torque is capable of spinning the gears 13, 24, 25 and 10, the countershaft 22, idler 45 and gear body 47.

The overrunning clutch external member 47 therefore would rotate, while the inner race members 49 and 49a would be standing still. Shifting of the member 47 from registry with the free race ring 48 to registry with the race surfaces of sleeve 49 would therefore require compensation somewhere along the line of torque connection, if impact shock in the overrunning clutch mechanism is to be avoided, even though a portion of such torque change may be absorbed in the fluid flywheel, since the combined inertias of the spinning parts are measurable in low foot pounds when suddenly coupled.

The applicant solves this problem by a novel controlled spin-prevention means which is always ready to operate when required, and is subject to the driver controls for initiating the drive to the output shaft 50. This means comprises a device for absorbing such residual torques applied to the constantly coupled reverse idler gear, embodying a set of friction elements, a self-loading mechanism and a power-operated actuator with a control coordinated with the control for the axial movement of the overrunning clutch.

When the overrunning clutch is moved toward either the forward or reverse drive position from neutral, the control for the spin-prevention means is energised, the self-loading mechanism action is initiated and the friction elements are loaded to brake the spin of the parts coupled to the reverse idler 45, wherein absorption of the residual torques occurs very rapidly. Completion of the shift motion causes the pin 200 of Fig. 10 to guide into the "F" or "N" positions so that the springs 74, 77 shift the valve 70 to the position at the right in which the vacuum port 71 is cut off.

Return of the shifter shaft 120 to "N" permits the springs 77 to push the cam 120b, arm 120a and the pin 200 to the vacuum cut-off position for valve 70. The servo action only occurs between the "F," "N," "R," positions of the motion as indicated in Fig. 10 on plate 203.

The central neutral flat of cam 120b is flanked by reverse and forward angular cam surfaces, the raised portion between neutral and reverse providing a stop feel for the hand of the operator, this assuring that this shift will not be made until the engine or car speeds are reduced.

For prevention of overheating and warping, the friction elements 51a and 51b are provided as multiple interleaved discs, their effective contact areas being adequate to halt the spinning rotation at speeds in effect double the normal idling speeds of 300 to 350 R. P. M., the fluid flywheel 4, 5, acting as a torque "safety valve" under abnormal circumstances such as might arise if the automatic choke of the engine were to cause a high idling rotation.

The successional timing of the control motions needed to assure complete absorption of spin energy by the device prior to proper application of torque to the overrunning clutch is an important factor. It is of further utility that the spin be interrupted during the interval when the operator is shifting the overrunning clutch from a forward or reverse drive position toward neutral. If one is endeavoring to rock a car out of soft mud, sand or snow, it is also desirable that the alternate coupling of forward and reverse drive be completed more rapidly than the vehicle inertia is damped, hence the control should operate quickly. An essential factor in the speed of operation of the spin-prevention means is the self-loading device 55, 56, 57 which is initiated by the power-operating means and completes its action by responding to the residual torque.

The operation of this device is measurable in fractions of a second, and it is observed that the higher the value of torque to be absorbed, the greater the loading action applied to the plates 51a and 51b.

It is not believed that the prior art discloses a spin-prevention means having these features and providing these useful results, which are now deemed important in view of the strong tendency for motor car drives to have a higher degree of automatic operation than heretofore.

With the present invention, by the mere moving of the operator's drive-selector lever, it is possible to obtain clean-cut and rapid shift for initial forward and reverse drive taken and transmitted thru positive drive mechanism; whereas in other transmission drives it is found necessary to provide large and expensive friction clutches or bands to obtain a desirable initiation of drive. The invention therefore saves costs and space, since the required parts are combined with other parts neatly and in the spaces already allotted by necessity for essential members in common gear boxes.

The foregoing specification has demonstrated the objects set forth in the preamble herein, and likewise shown important advantages in facilitating the pick-up of positive drive from a vehicle-standstill condition thru the agency of overrunning mechanism shiftable axially to connect the drive for both forward and reverse in a novel arrangement, the shift control means further controlling spin-prevention means which is coordinately actuated by self-loading mechanism and power-applied means, in which the overrunning devices are brought to drive registry without shock, and in which the required operations are rapidly and effectively completed. The particular wedge-type of overrunning clutch shown herein is by way of example and other types are usable in which the axial translation motion may be readily obtained, as will be understood by those skilled in the art. Certain advantages likewise obtain in the use of a transmission drive system in which the reduction gear torque is transmitted through a fluid flywheel, since the quick drive pick-up shift invention herein is particularly adaptable to this system, affording automatic coupling of forward and reverse drive without complicated clutch controls. It is further and particularly adapted to a drive system in which the second and higher speed torques are transmitted thru drive trains in parallel with that of the overrunning drive pick-up device so that shockless shift from and to the low gear train may be automatically effected.

Substitutions and equivalents for the construction elements shown herein may be made without departing from the spirit of the invention or from the scope of the following claims.

I claim:

1. In power transmissions, a power and a load shaft, a change speed gear unit adapted to couple said shafts at different speed ratios, including plural coupling means effective to connect said unit thru plural coupling elements to both said shafts, and including a fluid turbine coupling device and a one-way clutch in one line of drive between said shafts for coupling them at a reduction speed ratio, forward and reverse drive shifting means for connecting said load shaft with the drive of said unit, a control for said shifting means, and spin-prevention mechanism adapted to stop the rotation of the elements of said line of drive between said device and said one-way clutch made operable by said shifting means control.

2. In power transmissions, a power shaft, a load shaft, a change speed unit providing plural paths of torque for drive by gear elements at different reduction speed ratios between said shafts and for direct drive therebetween, a plurality of coupling members effective to connect both said shafts and said elements for establishing said plural torque paths, an arrangement of said unit in which one of said reduction gear paths of torque includes a fluid turbine coupling device constantly driven by said power shaft and adapted to transmit said reduction gear torque to the gear elements of said unit and to said load shaft, control means operative to transfer the drive of said unit from one path of torque to another and to interrupt the said drive, and spin-prevention means effective to stop the rotation of said gear elements when said control means is moved to interrupt the said drive.

3. In the combination set forth in claim 2, actuating mechanism for said spin-prevention means initiated by a connection from said control means and inertia-absorbing elements energised automatically by the rotation of said gear elements.

4. In the combination set forth in claim 2, power actuating mechanism for said spin-prevention means and a power control for the actuating mechanism made effective by a connection from the said drive control means.

5. In the combination set forth in claim 2, a power actuated mechanism for said spin-prevention means, a power control therefor, and a self-loading friction brake for said gear elements made operative by said mechanism.

6. In power transmissions, a power shaft and a load shaft, a change speed gear unit adapted to couple said shafts including drive-transmitting gear elements constantly connected to said power shaft and a plurality of coupling means for separately connecting said elements to said load shaft for forward and reverse drive and for disconnecting same to establish neutral, controls for said coupling means, and a spin-prevention brake for said gear elements made operative and inoperative by drive selecting motion of by said controls.

7. In vehicle transmission controls, a power shaft, a load shaft, a change-speed gear unit adapted to couple said shafts at different speed ratios including gear elements, plural coupling means including friction clutches for connecting said power shaft to said elements and plural coupling means including positively driving toothed members for connecting said elements to said load shaft, fluid pressure actuating means for said first-named coupling means, pumping means operated by rotation of said shafts for supplying said actuating means for said first-named fluid pressure actuated coupling means, a control for said second-named coupling means, a spin-prevention mechanism subject to said control and operative to stop the spinning-rotation of said elements, and a connection from the supply of said pumping means to said mechanism operative at above predetermined rotational speeds of said shafts to prevent the said mechanism from stopping the spinning of said elements.

8. In vehicle drive devices, an engine, a power delivering shaft, gearing means adapted to transmit forward and reverse gear torque to said shaft from said engine, and a translatable slider mechanism mounted for axial motion on said shaft including drive pick-up means effective to connect to said gearing means for forward or reverse torque transmission thereto, said pick-up means including one one-way clutch operative to transmit forward torque only and a second one-way clutch operative to transmit reverse torque only.

9. In the combination set forth in claim 8, an overrunning clutch race sleeve on said shaft and one-way locking bodies of said clutches contacting said sleeve when said mechanism is moved to a position between the positions for picking up the forward or reversed drive.

10. In power transmissions, a power shaft, a change-speed transmission having gear elements adapted to be coupled to said power shaft for different speed ratios of drive, a power delivery shaft adapted to be driven by said gear elements, an overrunning race sleeve freely mounted for rotation with respect to said shaft, a shiftable overrunning clutch mechanism mounted for axial motion along said shaft operable to connect the drive of said gear elements selectively to said shaft for forward or reverse drive and movable to a neutral position between said drive positions in which the said mechanism contacts said sleeve and is therefore inoperative to transmit drive to said shaft, a control means operable to shift said mechanism to said positions, and a spin-preventing brake for said gear elements and operated by said control means for effective prevention of spin of the elements during intervals of shifting of said mechanism to and from said neutral position.

11. In power transmission devices, a power delivery shaft, power-driven gear elements adapted to transmit forward or reverse torque to said shaft, a slider mechanism on said shaft embodying a toothed member for connecting to said gear elements for selected forward or reverse drive, overrunning clutch means included in said mechanism, said means having an outer race within said member, two inner races formed on said shaft and spaced axially apart, and two sets of one-way locking bodies located in the radial space between said races, one of said sets being arranged to couple the member and the shaft for one-way drive of said member of one hand of rotation, the other of said sets being arranged to couple the member and shaft for 1-way drive of the opposite hand of rotation, and a neutral position race sleeve rotatable on said shaft between the said inner races, said sleeve being in contact with said bodies when said slider is not connected to said gear elements for forward or reverse drive.

12. In a change speed gear drive for vehicles, a load shaft, forward and reverse gear drive means adapted for transmitting torque to said load shaft, gear selection controls, and overrunning clutch mechanism for coupling said gear means selectively to said shaft and movable axially by said controls for selecting the drive from said gear drive means to said shaft.

13. In power transmission devices, an engine, a driven shaft, a power transmission for coupling the engine to said shaft including a fluid flywheel unit constantly driven by said engine having a rotor connected to a hollow shaft on which is fixed a primary gear, a second hollow shaft to which is fixed a secondary gear and also the hub of a friction clutch plate, a reduction drive output gear member adapted to transmit drive to said shaft, countershaft gearing having teeth constantly meshed with said gears and having a set of output reduction gear teeth, a reverse idler gear with teeth constantly meshed with said latter teeth, a clutch drum attached to said shaft and enclosing said clutch plate, a second clutch plate rotating with said engine and enclosed within said drum, and a slider device including said member and an overrunning clutch mechanism slidable on said shaft for connecting the mechanism with said shaft and said member with said countershaft output reduction gear teeth or with said reverse idler.

14. In power transmission apparatus, an engine flywheel, a driving drum extending from said flywheel, an output shaft, a clutch drum within said driving drum and fixed to said output shaft, a clutch member for coupling said clutch drum to said flywheel, a second clutch member, a fluid flywheel unit having an impeller fixed to said driving drum and having a rotor, a hollow shaft enclosing a portion of said output shaft and attached to said second clutch member, a second hollow shaft enclosing a portion of said first hollow shaft and attached to said rotor, gearing means adapted to couple said hollow shafts with said output shaft and including one way clutch mechanism operative to couple the drive of said rotor thru said gearing means to said output shaft for forward and reverse drive thereof, and control means for said members and said gearing means operative to transfer the coupling of the drive from said rotor thru said mechanism to said second clutch member automatically when said gearing means is set for forward drive.

15. A two way over-running clutch comprising a rotary member having spaced cylindrical peripheral portions, a freely revoluble member between said spaced portions with its peripheral surface flush therewith, an annular member spaced from and surrounding said freely revoluble member, a pair of adjacent one-way clutch means for transmitting torque respectively in opposite directions arranged between said annular member and said freely revoluble member, and means for axially shifting said annular member together with said one-way clutch means to alternatively engage one or the other of the latter with the adjacent spaced peripheral portion of said rotary member to transmit torque in one direction between said portion and said annular member.

16. A two way over-running clutch comprising a rotary member having spaced cylindrical peripheral portions, a freely revoluble member between said spaced portions with its peripheral surface flush therewith, an annular member spaced from and surrounding said freely revoluble member, a pair of adjacent series of sprags for transmitting torque respectively in opposite directions arranged between said annular member and said freely revoluble member, means for holding said sprags in relation to said annular member, and means for axially shifting said annular member to alternatively engage one or the other of said series of sprags with the adjacent peripheral portion of said rotary member for the transmission of torque between the same and said annular member.

17. A two way over-running clutch comprising a rotary member, a pair of adjacent collars mounted thereon to rotate therewith, said collars having adjacent portions reduced in diameter to form an annular recess, a freely revoluble member located in said annular recess and having its peripheral surface flush with the peripheral surfaces of said collars, an annular member spaced from and surrounding said freely revoluble member, a pair of adjacent series of sprags between said annular member and freely revoluble member for respectively transmitting torque therebetween in opposite directions, end-thrust bearings at opposite ends of said series of sprags for retaining the same in relation with said annular member, and means for axially shifting said annular member to engage one or the other of said series of sprags with the peripheral surface of the collar adjacent thereto whereby torque may be transmitted between said annular member and rotary member alternatively in opposite directions.

WALTER B. HERNDON.

REFERENCES CITED

The following references are of record in the file of this patent:

UNITED STATES PATENTS

| Number | Name | Date |
|---|---|---|
| 2,104,608 | Cox et al. | Jan. 4, 1938 |
| 2,135,282 | Fottinger | Nov. 1, 1938 |
| 2,179,267 | Miller | Nov. 7, 1939 |
| 2,189,537 | Swennes | Feb. 6, 1940 |
| 2,260,581 | Pollard | Oct. 28, 1941 |
| 2,309,051 | Dodge | Jan. 19, 1943 |
| 2,321,226 | McKay | June 8, 1943 |
| 2,399,567 | Peterson et al. | Apr. 30, 1946 |
| 2,421,206 | Kylin et al. | May 27, 1947 |